United States Patent [19]
Simmering et al.

[11] 3,883,954
[45] May 20, 1975

[54] METHOD AND APPARATUS FOR RECORDING OCCLUSAL VIBRATIONS

[75] Inventors: Lawrence R. Simmering, Cinnaminson; Thomas B. Martin, Delran; Marvin B. Herscher, Cherry Hill, all of N.J.

[73] Assignee: Threshold Technology Inc., Cinnaminson, N.J.

[22] Filed: July 30, 1973

[21] Appl. No.: 383,900

[52] U.S. Cl. .................................. 32/19; 128/2 R
[51] Int. Cl. ............................................ A61c 9/00
[58] Field of Search ............ 32/19; 128/2 R, 2.05 R, 128/2.05 S, 2.1 A, 2.06 A, 2.06 F; 346/33 ME

[56] References Cited
UNITED STATES PATENTS
| | | | |
|---|---|---|---|
| 3,171,892 | 3/1965 | Pantle | 128/2.05 R |
| 3,599,628 | 8/1971 | Abbenante et al. | 128/2.06 F |
| 3,651,577 | 3/1972 | Brenman | 32/19 |

*Primary Examiner*—Louis G. Mancene
*Assistant Examiner*—J. Q. Lever
*Attorney, Agent, or Firm*—Martin Novack, Esq.

[57] ABSTRACT

An apparatus for producing a viewable record of the acoustic vibrations resulting from a successive plurality of acts of dental occlusion. Transducer means are provided for generating an electrical signal representative of vibrations from each act of occlusion. A threshold detector is responsive to the electrical signal and generates an enable signal when a predetermined threshold level is exceeded. A digitizing means, responsive to the enable signal, samples the electrical signal at a first clock rate and generates digital representations of the signal. A counter means, also responsive to enable signals, counts the number of acts of occlusion which have occurred since a particular reference time. A plurality of digital storage means are each operative in response to a particular count from the counter to store the digital representations resulting from a single act of dental occlusion. Means are also provided for sequentially reading out the digital representations from the plurality of storage means at a second lower clock rate. The read out digital signals are converted to analog signals and means are provided for recording the analog signals in visual form.

8 Claims, 2 Drawing Figures

METHOD AND APPARATUS FOR RECORDING OCCLUSAL VIBRATIONS

BACKGROUND OF THE INVENTION

This invention relates to dental instrumentation and, more particularly, to an apparatus and method for producing a viewable display of the acoustic vibrations resulting from dental occlusion.

Dental occlusion is the act of bringing the teeth together and the resultant relationships of opposing teeth to each other. Considerations of occlusion or biting are basic to dentistry and, yet, most dentists currently employ only crude methods of determining whether occlusion is proper; i.e., direct visual inspection and/or the use of articulating paper. Typically, articulating paper is placed between the teeth before a bite and the paper causes colored marks at areas of tooth-to-tooth contacts.

An act of dental occlusion can be considered as a sequence of three distinct events; (1) initial contact of teeth, (2) transient tooth relationships, and (3) endpoint or the final relationship of teeth. Conventional visual inspection methods yield some information about the end-point but don't reveal significant information about initial contact of teeth or transients. It is virtually impossible to observe these events within a patient's mouth, the events being dynamic in nature. The jaw muscles move the mandible to the stage of initial contact, but thereafter the mandible is guided to its end-point by the inclinations of the cusps of the teeth. These dynamic events between initial contact and terminal closure (or end-point) are of great importance in the clinical treatment of occlusion.

A technique was previously devised for evaluating the totality of events of dental occlusion using acoustic analysis. When upper and lower teeth contact each other, sound arise from the vibrations produced by friction between the teeth as they slide and slip during closure of the mandible and by the final impact occurring at the point of terminal closure. The sound of short duration, for example 25 milliseconds, and the sound wave variations reflect the pattern of slipping and sliding. In the U.S. Pat. No. 3,651,577 there is disclosed an apparatus for producing "occlusograms"; i.e., graphic representations of the acoustic vibrations which result from an act of dental occlusion. In the embodiment described in the patent, sound waves resulting from dental occlusion are recorded on magnetic tape and subsequently read off the tape at a much diminished speed so that the signals are recordable on a reasonable length of polygraph paper. A disadvantage associated with playing back the magnetic tape at a slow speed is the introduction of noise. Also, there are operational limitations when attempting to use a mechanical system to obtain accurate data from a patient. The nature of occlusion makes it desirable to record a number of bites in a natural quick succession. This allows the patient to exhibit natural occlusion without the false emphasis that may characterize a single isolated bite. Fruther, it is advantageous to examine the characteristics of a number of bites in succession to evaluate the consistency of occlusion. Finally, there should ideally be a minimum of operationally complexity so that the dentist can conveniently take meaningful data on a first attempt.

Accordingly, it is an object of this invention to provide an all-electronic equipment which can generate "occlusograms" in the manner indicated.

SUMMARY OF THE INVENTION

The present invention is directed to an apparatus for producing a viewable record of the acoustic vibrations resulting from a successive plurality of acts of dental occlusion. Transducer means are provided for generating an electrical signal representative of vibrations from each act of occlusion. A threshold detector is responsive to the electrical signal and generates an enable signal when a predetermined threshold level is exceeded. A digitizing means, responsive to the enable signal, samples the electrical signal at a first clock rate and generates digital representations of the signal. A counter means, also responsive to enable signals, counts the number of acts of occlusion which have occurred since a particular reference time. A plurality of digital storage means are each operative in response to a particular count from the counter to store the digital representations resulting from a single act of dental occlusion. Means are also provided for sequentially reading out the digital representations from the plurality of storage means at a second lower clock rate. The read out digital signals are converted to analog signals and means are provided for recording the analog signals in visual form.

Further features and advantages of the invention will become more readily apparent from the following detailed description when taken in conjunction with the accompanying drawings.

DESCRIPTION OF THE PREFERRED EMBODIMENT

Figure 1:
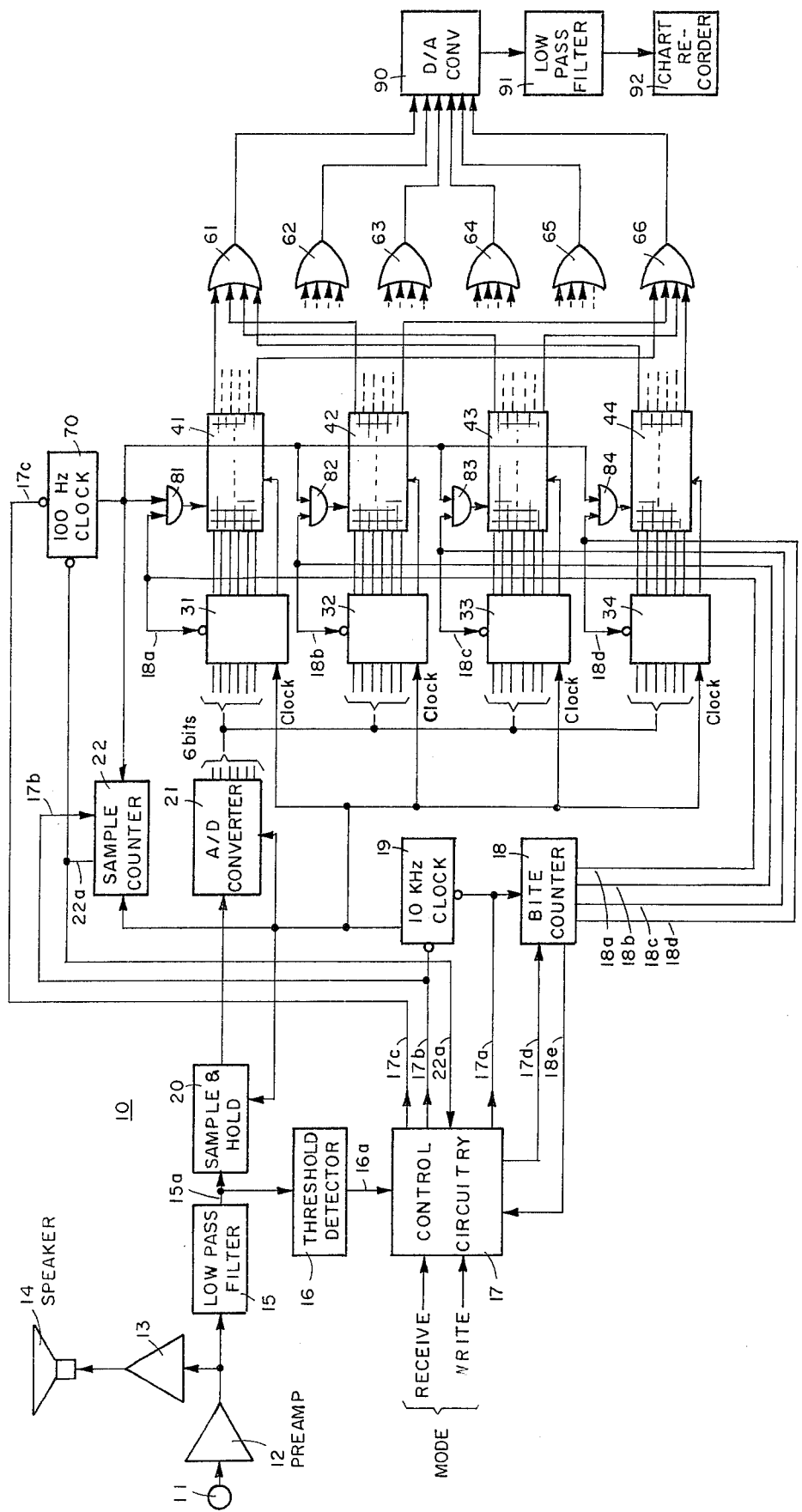
FIG. 1 is a block diagram of an embodiment of an apparatus in accordance with the invention.

Referring to FIG. 1, there is shown a block diagram of an apparatus 10 in accordance with the invention. A contact microphone 11 is positionable at a location where it can best receive occlusal sounds. Preferably, the microphone is strapped on a patient's forehead such that it receives the bit pattern sounds by bone conduction. The microphone output is preamplified and then coupled through an amplifier 13 to a speaker 14 which projects the sound of a bite as it occurs. The output of preamplifier 12 is also coupled to a low-pass filter 15 which eliminates high frequency noise and bite components not of interest. A filter cutoff of about 2.5 kHz has been found suitable.

The filtered signal is coupled to threshold detector 16 which may typically include a rectifier and a level detector. When a predetermined threshold voltage level is exceeded, a signal 16 is generated and received by control circuitry 17. This signal indicates the onset of an act of oral occlusion that is to be ultimately recorded in graphic form.

The control circuitry 17 receives manually initiated commands from an equipment control panel (not shown) which indicate whether the equipment is in its "receive" mode, i.e., ready to receive bite information from a patient, or in its "write" mode wherein the bite information is graphically recorded. During the "receive" mode the signal 16a triggers an enable signal 17a which is received by a "bite counter" 18 and a first clock 19 which, in the present embodiment, operates at 10 kHz. Pulses from the clock 19 are fed to a sample-and-hold circuit 20 and an associated analog-to-digital converter 21 which, in the present embodiment, generates six output bits. The output of filter 15, designated 15a, is thus digitized at a sampling rate of 10 kHz with the converter 21 generating a new six-bit "word" every 0.1 millisecond. Pulses from the clock 19 are also received by a sample counter 22 which generates an output 22 after the clock 19 has produced 256 pulses; viz., 25.6 milliseconds after the onset of a bite sound. Upon receipt of signal 22 the control circuitry issues a signal 17 which disables output from the clock 19 and resets the sample counter 22 to zero.

The bite counter 18 will be recalled as having received the enable signal 17 at the onset of a bite sound. The counter 18 is stepped by one count each time an enable signal is received and is adapted to count to four in the present embodiment. Each different count, one through four, is represented by the presence of an output on one of the lines 18 through 18, respectively. A count of zero is manifested by the absence of an output on all lines. Thus, for example, if the first enable signal has just been received, an output will appear on line 18a only. When the next enable signal is received by counter 18 an output will appear on line 18b only, and so on. The bite counter is reset to a count of zero after a full cycle, as represented by the connection 18e The signals 18a through 18d are coupled to the "enable" terminals of four gates lablelled 31, 32, 33 and 34. These gates each receive the six bit word output of A/D converter 21, but only the gate that is enabled at a particular time passes the digital words. Each gate, when enabled, also passes pulses from clock 19. The outputs of gates 31 through 34 are coupled to four six-level 256-stage shift registers designated by reference numerals 41 through 44. Therefore, depending on which gate is enabled, 256 six-bit digital words, representative of the sound sampled during the 25.6 miliseconds after a bite sound onset, are clocked into one of the shift registers.

The outputs of shift registers 41 through 44 are coupled to a column of six "OR" gates 61 through 66 with the "bit 1" output of each shift register being an input to OR gate 61, the "bit 2" output of each shift register being an input to OR gate 62 and so on. The shift registers 41 through 44 are clocked out one at a time so the outputs of OR gates 61 through 66 correspond to the output of the particular shift register being clocked out. When the "write" mode is activated, such as by pushing a button on the equipment console (not shown), the contents of the shift registers 41 through 44 are sequentially read out. This function is set in motion by the control circuitry 17 which, having received a "write" command, issues a signal 17c that enables the output of a second clock 70 which, in the present embodiment, operates at 100Hz. The control circuitry 17 also issues a signal 17d which steps the bite counter 18. The line outputs of bite counter 18, i.e., 18a through 18d, are additionally coupled to four AND gates designated 81 through 84. These AND gates each receive as their other input the output of clock 70. The outputs of the gates 81 through 84 are respectively coupled to the shift registers 41 through 44 and are utilized to clock out these registers. The output of clock 70 is also received by the sample counter 22 which generates an output 22a after receiving 256 clock pulses; viz., after 2.56 seconds of clocking. The signal 22a is operative to disable the clock 70 and is coupled, as previously indicated, to control circuitry 17. Upon receiving the signal 22a while in the "write" mode, the control circuitry 17 after a short delay produces another pair of signals 17c and 17d which respectively reenable clock 70 and step the bite counter 18 to a next higher count. In this manner, the AND gates 81 through 84 are sequentially enabled (by the lines 18a through 18d) to clock out the shift registers 41 through 44 at the lower clock rate of 100 Hz.

Figure 2:
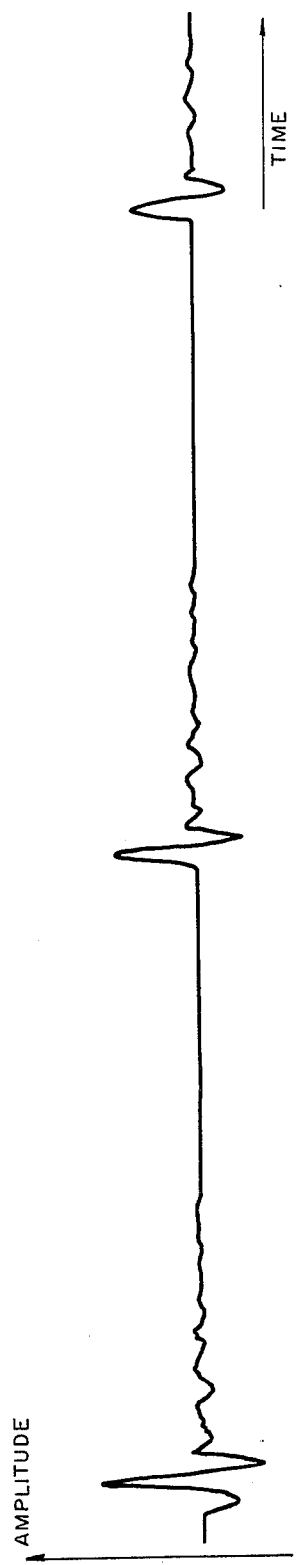
FIG. 2 illustrates, on a reduced scale, the type of graphs that can be generated utilizing the present invention.

The six output bits from OR gates 61 through 66 are coupled to a digital-to-analog converter 90 which generates four segments of analog information, each having a duration of 2.56 seconds. This analog information coupled through a low pass filter 91 to a chart recorder 92 which operates, in the present embodiment, at 1 inch per second. Each act of occlusion recorded on the chart paper therefore requires about 2½ inches of paper length. FIG. 2 depicts a length of chart paper upon which have been recorded consecutive acts of occlusion that were processed in accordance with the present invention.

It should be recognized from the foregoing description that control circuitry 17 is essentially a sequencer which performs conventional gating and timing functions. When the equipment is in the "receive" mode, a gate in circuitry 17 is activated to convert the bite onset indicative signals 16a into the signals 17a which enable the output of clock 19 and step the bite counter 18. The signal 22a from the sample counter enables another logic gate in circuitry 17 to generate the signal 17b which disables the output of clock 19 and resets counter 22. When the "write" mode is manually activated the signals 17c and 17d are immediately generated to initiate readout from the first register, 41. Thereafter, the signal 22a triggers generation of the signals 17c and 17d which cause readout of the next register. The chart recorder 92 is, of course, constrained to operated only during the "write" mode.

The unit operates with ease after the contact microphone has been strapped to a patient's head. Preferably, the dentist puts the equipment in the "receive" mode and instructs the patient to bite four times in succession. The onset of each bite renders operative, in the manner previously described, the circuitry which stores 25.6 milliseconds of digital information about each bite in the four shift registers. A convenient graphical record of the four bites is then obtained by activating the "write" mode which causes the automatic readout, conversion, and recording of the stored digital information from each register. The four occlusal patterns can then be compared against each other, against standards, or against past data from the same patient. The invention has been described with reference to a particular embodiment, but it will be understood that variations within the spirit and scope of the invention will occur to those skilled in the art. For example, provision could be made for adjusting the overall level of received occlusal sounds. Also, provision could be made for clearing the registers, if desired, without "writing" their contents.

We claim:

1. Apparatus for producing a viewable display of the acoustic vibrations resulting from an act of dental occlusion, comprising:
   transducer means for generating an electrical signal representative of vibrations from oral occlusion;
   threshold detection means responsive to said electrical signal for generating an enable signal when said electrical signal exceeds a predetermined threshold condition;
   digitizing means responsive to said enable signal for sampling said electrical signal at a first clock rate and generating digital representations of said signal;
   means for storing said digital representations;
   means for reading out the stored digital representations at a second lower clock rate;
   means for converting the read out digital signals to analog signals; and
   means for displaying said analog signals.

2. The apparatus as defined by claim 1 wherein said means for storing said digital representations comprises;
   a shift register responsive to said enable signal for storing said digital representations at said first clock rate;
   a sample counter for counting the duration of information receipt by said shift register; and
   means responsive to the output of said sample counter for automatically disabling further action by said shift register after a predetermined amount of information has been received.

3. Apparatus for producing a veiwable record fo the acoustic vibrations resulting from a successive plurality of acts of dental occlusion, comprising:
   transducer means for generating an electrical signal output representative of vibrations from each act of occlusion;
   threshold detection means responsive to the output of said transducer means for generating an enable signal when a predetermined threshold condition is attained;
   digitizing means responsive to said enable signal for sampling said electrical signal at a first clock rate and generating digital representations of said signal;
   bite counter means responsive to enable signals for counting the number of acts of occlusion which have occurred from a particular reference time;
   a plurality of storage means, each operative in response to a particular count from said bite counter to store the digital representations resulting from a single act of dental occlusion;
   means for sequentially reading out the digital representations from said plurality of storage means at a second lower clock rate;
   means for converting the read out digital signals to analog signals; and
   means for recording said analog signals in viewable form.

4. The apparatus as defined by claim 2 wherein each of said storage means comprises a shift register responsive to said enable signal for storing said digital representations at said first clock rate; and further comprising:
   a sample counter for counting the duration of information clocked into or out of said shift register; and
   means responsive to the output of said sample counter for temporarily diabling further action by said shift registers after a predetermined amount of information has been transferred.

5. The apparatus as defined by claim 4 wherein said means for sequentially reading out the digital representations comprises:
   a plurality of gates corresponding to the plurality of shift registers, each of said gates being activated by a particular count from said bite counter to allow the clocking out of its corresponding shift register; and
   means for sequentially stepping said bite counter to effect the sequential clocking out of all shift registers.

6. The apparatus as defined by claim 5 wherein said means for recording comprises a chart recorder.

7. A method for producing a viewable record of the acoustic vibrations resulting from a successive plurality of acts of dental occlusion, comprising the steps of:
   a. generating an electrical signal output representative of vibrations from each act of occlusion;
   b. generating an enable signal when the electrical signal output attains a predetermined threshold condition;
   c. sampling the electrical signal at a first clock rate and generating digital representations of the signal;
   d. counting the number of acts of occlusion which have occurred;
   e. storing in different locations the digital representations resulting from each act of occlusion, the instantaneous storage location depending on the count at a particular time;
   f. sequentially reading out the digital representations from the storage means at a second lower clock rate;
   g. converting the read out digital signals to analog signals; and
   h. recording the analog signals in viewable form.

8. A method for producing a viewable display of the acoustic vibrations resulting from an act of dental occlusion, comprising the steps of:
   a. generating an electrical signal representative of vibrations from oral occlusion;
   b. generating an enable signal when the electrical signal exceeds a predetermined threshold level;
   c. sampling the electrical signal at a first clock rate and generating digital representations of said signal;
   d. storing the digital representations;
   e. reading out the stored digital representations at a second lower clock rate;
   f. converting the read out digital signals to analog signals; and
   g. displaying said analog signals in viewable form.

* * * * *